United States Patent
Pasqua et al.

(10) Patent No.: US 9,505,462 B2
(45) Date of Patent: Nov. 29, 2016

(54) BICYCLE GEARSHIFT WITH IMPROVED PRECISION CONTROL

(71) Applicant: Campagnolo S.r.l., Vicenza (IT)

(72) Inventors: Paolo Pasqua, Camisano Vicentino (IT); Giuseppe Dal Prà, Zanè (IT)

(73) Assignee: Campagnolo S.r.l., Vicenza (IT)

( * ) Notice: Subject to any disclaimer, the term of this patent is extended or adjusted under 35 U.S.C. 154(b) by 60 days.

(21) Appl. No.: 14/186,248

(22) Filed: Feb. 21, 2014

(65) Prior Publication Data

US 2014/0243130 A1 Aug. 28, 2014

(30) Foreign Application Priority Data

Feb. 22, 2013 (IT) .............................. MI2013A0251

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |

(Continued)

(52) U.S. Cl.
CPC ........... *B62M 9/1242* (2013.01); *B62M 9/125* (2013.01); *B62M 9/126* (2013.01)

(58) Field of Classification Search
CPC .. B62M 9/127; B62M 9/1242; B62M 9/126; B62M 9/1244; B62M 25/02
USPC ...................................... 474/80, 82
See application file for complete search history.

(56) References Cited

U.S. PATENT DOCUMENTS

| | | | | |
|---|---|---|---|---|
| 3,181,383 A | * | 5/1965 | Juy ...................... | B62M 9/1242 280/261 |
| 4,269,601 A | * | 5/1981 | Nagano ................ | B62M 9/1248 474/134 |

(Continued)

FOREIGN PATENT DOCUMENTS

| | | |
|---|---|---|
| EP | 1357023 A1 | 10/2003 |
| EP | 1816064 A2 | 8/2007 |

OTHER PUBLICATIONS

Italian Search Report and Written Opinion in Italian Application No. IT MI2013A000251, Nov. 20, 2013 with English translation.

*Primary Examiner* — Henry Liu
(74) *Attorney, Agent, or Firm* — Volpe and Koenig, P.C.

(57) ABSTRACT

The present invention refers to a bicycle gearshift with improved precision control, comprising a kinematic mechanism in the form of a four-bar linkage with a base body and a mobile body connected together through a pair of connecting rods articulated to the base body and to the mobile body at four pin elements, each pair of opposite pin elements of the four pin elements defining a diagonal of the four-bar linkage kinematic mechanism, and a first attachment group of the base body to a bicycle frame, the mobile body being connected to a chain guide at a second attachment group, the four-bar linkage kinematic mechanism being associated with gearshift actuation means suitable for deforming the four-bar linkage kinematic mechanism so as to determine a displacement of the mobile body with respect to the base body and consequently a primary displacement of the chain guide in the axial direction with respect to the axis (A) of a cogset, and it is characterised in that the first attachment group comprises a kinematic mechanism for changing the relative angular position between the base body of the four-bar linkage kinematic mechanism and the frame as a function of the primary displacement of the chain guide.

11 Claims, 9 Drawing Sheets

(51) Int. Cl.
    *B62M 9/1242* (2010.01)
    *B62M 9/125* (2010.01)
    *B62M 9/126* (2010.01)

(56) References Cited

U.S. PATENT DOCUMENTS

| | | | | |
|---|---|---|---|---|
| 4,306,871 A | * | 12/1981 | Nagano | B62M 9/127 474/82 |
| 4,437,848 A | * | 3/1984 | Shimano | B62M 9/1242 474/82 |
| RE32,059 E | * | 12/1985 | Nagano | B62M 9/127 474/78 |
| 4,801,287 A | * | 1/1989 | Romano | B62M 9/1242 474/82 |
| 5,857,932 A | * | 1/1999 | Sugimoto | B62L 1/14 188/24.22 |
| 5,904,629 A | * | 5/1999 | Oka | B62M 9/127 180/231 |
| 6,030,307 A | * | 2/2000 | Oka | B62M 9/127 474/175 |
| 7,905,804 B2 | * | 3/2011 | Yamaguchi | B62M 9/125 474/80 |
| 8,012,052 B2 | * | 9/2011 | Shahana | B62M 9/1242 474/82 |
| 8,137,223 B2 | * | 3/2012 | Watarai | B62K 23/06 280/260 |
| 8,419,573 B2 | * | 4/2013 | Yamaguchi | B62M 9/1242 267/155 |
| 2004/0106482 A1 | * | 6/2004 | Nagano | B62M 9/126 474/82 |
| 2007/0021246 A1 | * | 1/2007 | Shahana | B62M 9/126 474/82 |
| 2008/0026890 A1 | * | 1/2008 | Oseto | B62M 9/1242 474/82 |
| 2008/0051237 A1 | * | 2/2008 | Shahana | B62M 9/1244 474/82 |
| 2009/0098963 A1 | * | 4/2009 | Watarai | B62K 23/06 474/80 |

\* cited by examiner

BICYCLE GEARSHIFT WITH IMPROVED PRECISION CONTROL

CROSS REFERENCE TO RELATED APPLICATION

This application claims the benefit of Italian Application No. MI2013A000251, which was filed on Feb. 22, 2013, and is incorporated herein by reference as if fully set forth.

FIELD OF INVENTION

The present invention refers to a bicycle gearshift with improved precision control.

BACKGROUND

By bicycle gearshift a mechanical device is meant that causes the transmission chain to move between different toothed wheels, for this purpose moving a chain guide in which the chain is engaged.

In the context of this patent description and of the following claims, the gearshift being referred to is the rear one that moves the transmission chain between the different sprockets of a cogset associated with the rear wheel of the bicycle.

Normally, the bicycle gearshift comprises a kinematic mechanism in the form of a four-bar linkage (typically an articulated parallelogram) with a base body and a mobile body opposite the base body in the four-bar linkage, connected together through a pair of connecting rods hinged to such bodies according to four hinge axes through four pin elements, in which the base body is fixed to the frame of the bicycle and the mobile body is fixed to a chain guide.

The deformation of the four-bar linkage therefore determines a displacement of the chain guide with respect to the frame in the axial direction with respect to the cogset and, in this way, gearshifting.

The deformation of the four-bar linkage can be obtained with manual actuation, through the movement of control levers and the transmission thereof to the four-bar linkage through a Bowden cable, or with motorized actuation, thanks to an electric motor that—after a suitable command imparted by the cyclist and through a suitable mechanism—moves different parts of the four-bar linkage with respect to one another, thus deforming it and moving the chain guide.

Bicycle gearshifts with motorized actuation are described for example in EP1357023; in them, the kinematic mechanism acts by moving opposite pins of the four-bar linkage towards and away from one another.

An ongoing objective of manufacturers of gearshifts is to improve the precision of actuation, upon which the ease and reliability of operation of the gearshift depends.

This requirement is increasingly important the more the gearshift is intended to be used in high-level cycling competitions.

In order to obtain high precision of control of known bicycle gearshifts, an initial adjustment of the bicycle is made in order to optimise the tensioning of the chain depending on the configuration and structure of the frame and of the cogset associated with the rear wheel.

Some gearshifts, used particularly for mountain-bikes, comprise an initial setting interface of a relative angular position between the base body of the kinematic mechanism and the frame and a chain tensioning spring, inserted in the kinematic mechanism, which make it possible to determine the set-up of the chain guide when engaged with the chain of a transmission.

In such types of gearshift, the initial adjustment acts on the relative angular position between the base body of the kinematic mechanism and the frame, as well as on the spring inserted in the kinematic mechanism, possibly setting a preload thereof, in order to keep the correct tension of the transmission chain in the different travel configurations.

The initial setting of the relative angular position between the base body and the frame and of the preload of the chain tensioning spring is carried out so as to lift the chain guide to bring it as close as possible to the sprockets.

Indeed, a small distance between the chain guide and the sprockets determines greater sensitivity of control since, in such conditions, the displacement component of the chain guide parallel to the axis of the sprockets corresponds to an inclination exerted on the chain that is sufficient to trigger a displacement from one sprocket to the other.

The lifting of the chain guide towards the sprockets does, however, have a limitation dictated by the sprocket of largest diameter. Moreover, getting too close to the sprocket with largest diameter is the cause of drawbacks such as the feeling of sudden gearshifting between the lowest gear to the next one, as well as slipping between the chain and the chain guide in the case of the lowest gear and pedalling backwards.

The Applicant has realised that in the adjustment configuration closest to the sprockets, set by the dimensions of the largest sprocket, there is still a substantial vertical spacing between the chain guide and the sprockets with smaller size and, consequently, the precision of gearshifting control between the highest gears is less than between the lower gears.

Therefore, the problem forming the basis of the invention is that of avoiding the aforementioned drawbacks, in particular by providing a bicycle gearshift that is able to offer improved precision gearshifting.

More specifically, the problem forming the basis of the present invention is that of making a bicycle gearshift that allows the distance of positioning between the chain guide and the smaller sized sprockets to be reduced with respect to known gearshifts, without however entailing the drawbacks dictated by bringing the chain guide too close to the largest sprocket.

SUMMARY OF THE INVENTION

The invention foresees a bicycle gearshift comprising a four-bar linkage-kinematic mechanism with a base body and a mobile body connected together through a pair of connecting rods articulated to the base body and to the mobile body at four pin elements, each pair of opposite pin elements of the four pin elements defining a diagonal of the four-bar linkage-kinematic mechanism, and a first attachment group of the base body to a bicycle frame, the mobile body being connected to a chain guide at a second attachment group, the four-bar linkage-kinematic mechanism being associated with gearshift actuation means suitable for deforming the four-bar linkage kinematic mechanism so as to determine a displacement of the mobile body with respect to the base body and consequently a primary displacement of the chain guide in the axial direction with respect to the axis of a cogset, characterised in that the first attachment group comprises a kinematic mechanism for changing the relative angular position between the base body of the four-bar linkage-kinematic mechanism and the frame as a function of the primary displacement of the chain guide.

Changes in the relative angular position between the base body and the frame and, consequently, between the chain guide and the sprockets, advantageously determine an alteration of the trajectory described by the displacement of the chain guide imposed by the deformation imposed by the four-bar linkage.

The trajectory is modified going progressively towards the sprockets of smaller diameter in order to keep the chain guide substantially at the same distance from the sprocket onto which it must direct the chain, irrespective of which sprocket it is.

Moving closer to the smaller sprockets with respect to the solutions of the state of the art determines greater sensitivity of the system to an axial displacement of the chain guide and therefore, overall, a greater precision of control of the gearshift, in particular between the lower gears.

In particular, according to the invention, the kinematic adjustment mechanism acts so as to rotate the base body of the four-bar linkage kinematic mechanism in the counter-clockwise direction about an axis of a first attachment group to the bicycle frame when the chain guide moves towards the largest sprocket or, vice-versa, so as to rotate the base body of the four-bar linkage kinematic mechanism in the clockwise direction, when the chain guide moves towards the smallest sprocket.

This embodiment of the bicycle gearshift can be further improved through the following additional features that can be combined with each other as desired.

In accordance with a preferred embodiment of the present invention, the first attachment group comprises a pin body having axis C, intended for attaching the base body to the bicycle frame, and the kinematic mechanism for changing the relative position between the base body and the frame comprises:

a rotary body connected to the pin body so that a rotation of the rotary body determines a relative rotation about the axis C between the pin body and the base body;

a toothed sector formed on the rotary body; and at least one pinion engaged with the toothed sector for transferring a controlled rotation to it, the pinion being directly or indirectly set in rotation by the gearshift actuation means.

In this way, it is ensured that the actuation imparted on the gearshift is automatically transferred to the kinematic mechanism for changing the relative angular position between the base body and the frame. Indeed, such an embodiment ensures that the rotation imparted by the actuation means to the pinion is transferred in the simple, precise and reliable manner to the pin body of the first attachment means.

Preferably, the first attachment group comprises a shock-absorbing spring that engages at its first end with the rotary body and is constrained at its second end to the pin body.

Advantageously, in this embodiment an element is provided for that is capable of absorbing possible external forces beyond a certain limit that could cause the gearshift to break.

According to a particularly advantageous embodiment of the present invention, the first attachment group comprises an initial setting interface of a relative angular position between the base body and the frame, wherein such an interface comprises an attachment element in which the pin body engages and an adjustment screw that engages on the attachment element, going into abutment against the frame.

In this way, it is possible to set an initial relative position between the base body of the four-bar linkage kinematic mechanism and the frame in order to optimise the set-up of the chain guide as a function of the specific frame and cogset mounted on the bicycle.

Preferably, the pinion is mounted in a fixedly connected manner on a pin element of the four pin elements of the four-bar linkage kinematic mechanism, wherein the pin element is fixedly connected to one of the connecting rods.

In such an embodiment, the kinematic mechanism for changing the relative angular position is actuated directly by a relative rotation between the base body/the mobile body and a connecting rod. In this way a solution is obtained that is particularly simple from the structural point of view to reliably correlate the deformation of the four-bar linkage and the change in the relative position between the base body and the frame.

Alternatively, the pinion is mounted in a fixedly connected manner on an actuation pin substantially parallel to the pin elements and set in rotation by the gearshift actuation means.

Preferably, the gearshift actuation means are of the motorized type and comprise a motor that drives the displacement of a shaft along a diagonal of the four-bar linkage kinematic mechanism.

Such a particularly advantageous embodiment allows the action of changing the relative position to also be motorized, gaining greater precision of the gearshift. Moreover, the cyclist is required to apply a minimal actuation force, since gearshifting and the change of the relative position are obtained by the action of the motorized actuation means.

Even more preferably, the motor is supported inside the four-bar linkage kinematic mechanism through a support shell constrained in a tilting manner to a first pin element of the four pin elements, wherein the shaft acts on a pin element of the four pin elements opposite the first.

Such an embodiment is particularly versatile, being able to use a plurality of actuation means, also including known devices that are widely available on the market, whilst still keeping the characteristic compactness required of a bicycle gearshift unchanged.

In such an embodiment, the first pin element is advantageously made up of a pair of half-pins that engage so as to be free to rotate in two opposite seats of the support shell, wherein the pinion is mounted in a fixedly connected manner on a first half-pin of the pair of half-pins.

Preferably, the motor has its outlet axis perpendicular to the shaft and drives a rotation of the actuation pin, wherein the actuation pin bears a toothed spindle rotating as a unit with it in shape coupling with a rack formed on the shaft in order to determine a displacement in translation of the shaft.

The rack is preferably guided in translation inside a tubular portion of a guide shell idly mounted on the actuation pin, wherein the guide shell encloses the toothed spindle in order to keep the shape coupling between the toothed spindle and the rack.

The Applicant has found that with such a structure it is possible to obtain a particularly compact and precise solution. Moreover, the actuation of the kinematic mechanism for changing the relative angular position takes place substantially directly through the motor.

According to a further alternative, the gearshift actuation means are of the mechanical type and comprise:

a sheath seat for the support of a control cable comprising an outer sheath relative to which an inner cable core is free to slide, wherein the sheath seat fixes the outer sheath in position in order to allow the sliding of the inner core, a retaining clip of one end of the inner core, wherein the sheath seat and the clip are arranged substantially at pin elements that are diagonally opposite in the four-bar linkage-kinematic mechanism, a return spring arranged at one of the pin elements, to deform the four-bar linkage-kinematic mechanism in contrast to the traction imposed by a relative translation between the outer sheath and the inner core of the control cable.

In such a variant provided with mechanical actuation there are advantages in terms of response times to the actuation command characteristic of a direct actuation like a mechanical one.

Preferably, the pin body of the first attachment group comprises a cylindrical bushing and a closing screw provided with an enlarged head suitable for engaging with the base body, wherein the cylindrical bushing and the closing screw are screwed into each other in order to hold the base body in the direction of the axis of the pin body, wherein sliding means for rotation are arranged between the base body and the pin body.

Preferably, the second attachment group comprises a fifth pin element fixedly connected, at a first end, to the chain guide and provided, at a second end, opposite the first, with a connection interface to the mobile body, wherein the second attachment group comprises a chain tensioning spring and the fifth pin element acts as a support body of the chain tensioning spring.

BRIEF DESCRIPTION OF THE DRAWINGS

Further features and advantages of the present invention will become clearer from the following detailed description of some preferred embodiments thereof, made with reference to the attached drawings. The different features in the single configurations can be combined together as desired according to the above description, if it is necessary to have the advantages resulting specifically from a particular combination.

In such drawings.

DETAILED DESCRIPTION OF THE PREFERRED EMBODIMENT(S)

Figure 1:
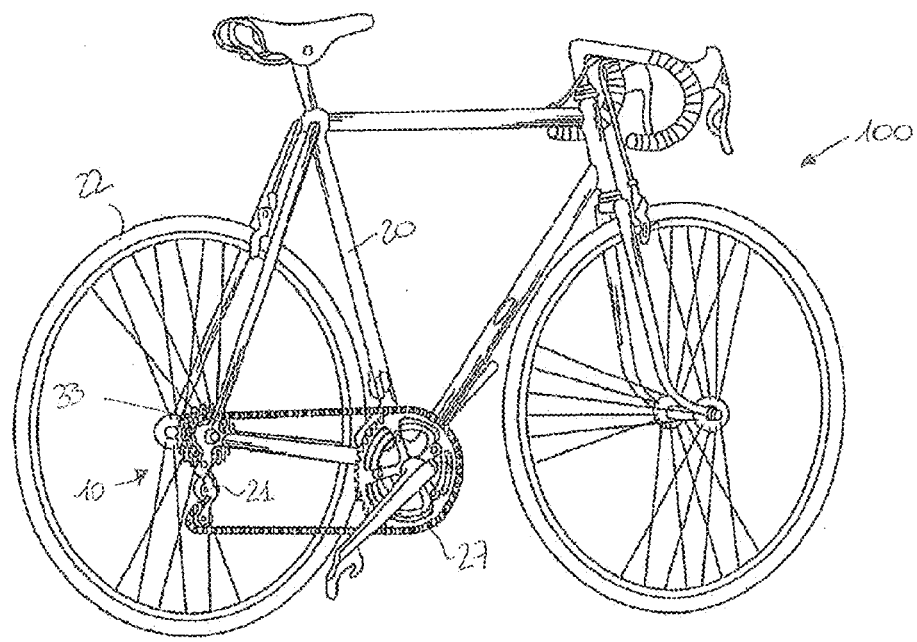
FIG. 1 is a schematic side view of a mountain-bike using a bicycle gearshift according to the present invention.
Figure 2:
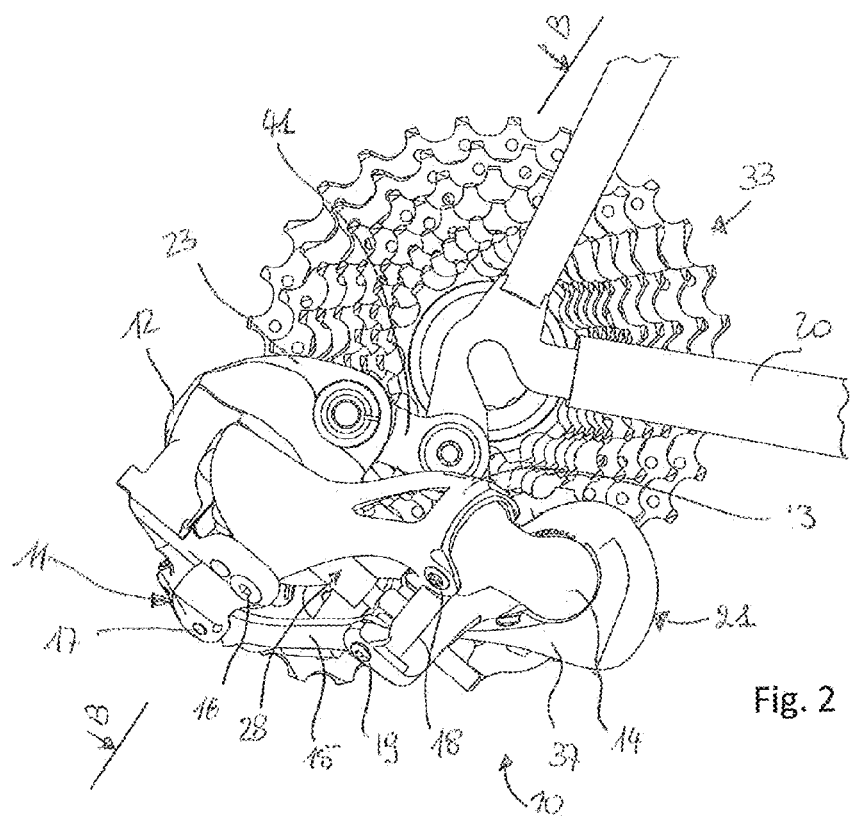
FIG. 2 shows a bicycle gearshift according to the present invention associated with a bicycle frame and with a cogset.
Figure 3A:
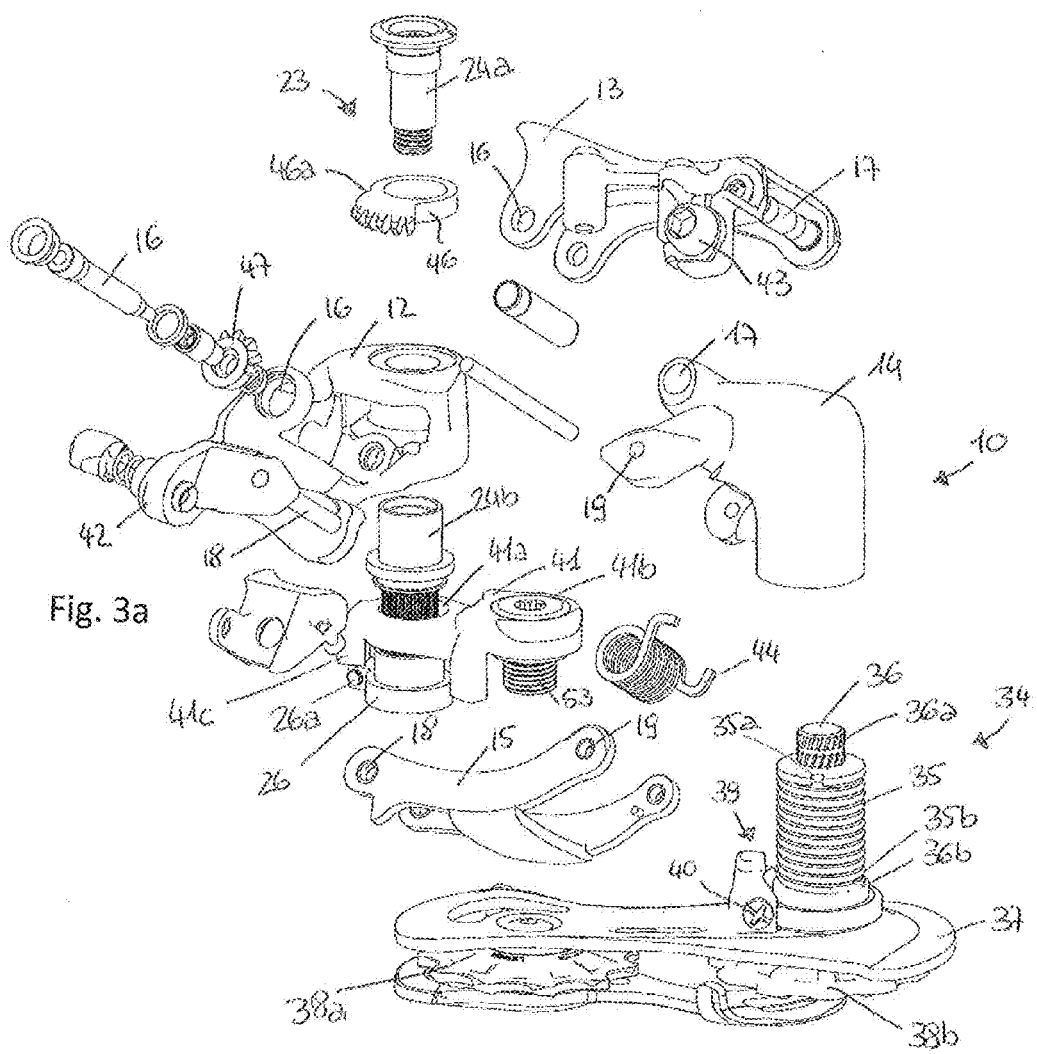
FIGS. 3a and 3b respectively show an exploded view and a section view along the line B-B of FIG. 2 of a first embodiment of the bicycle gearshift according to the present invention.
Figure 3B:
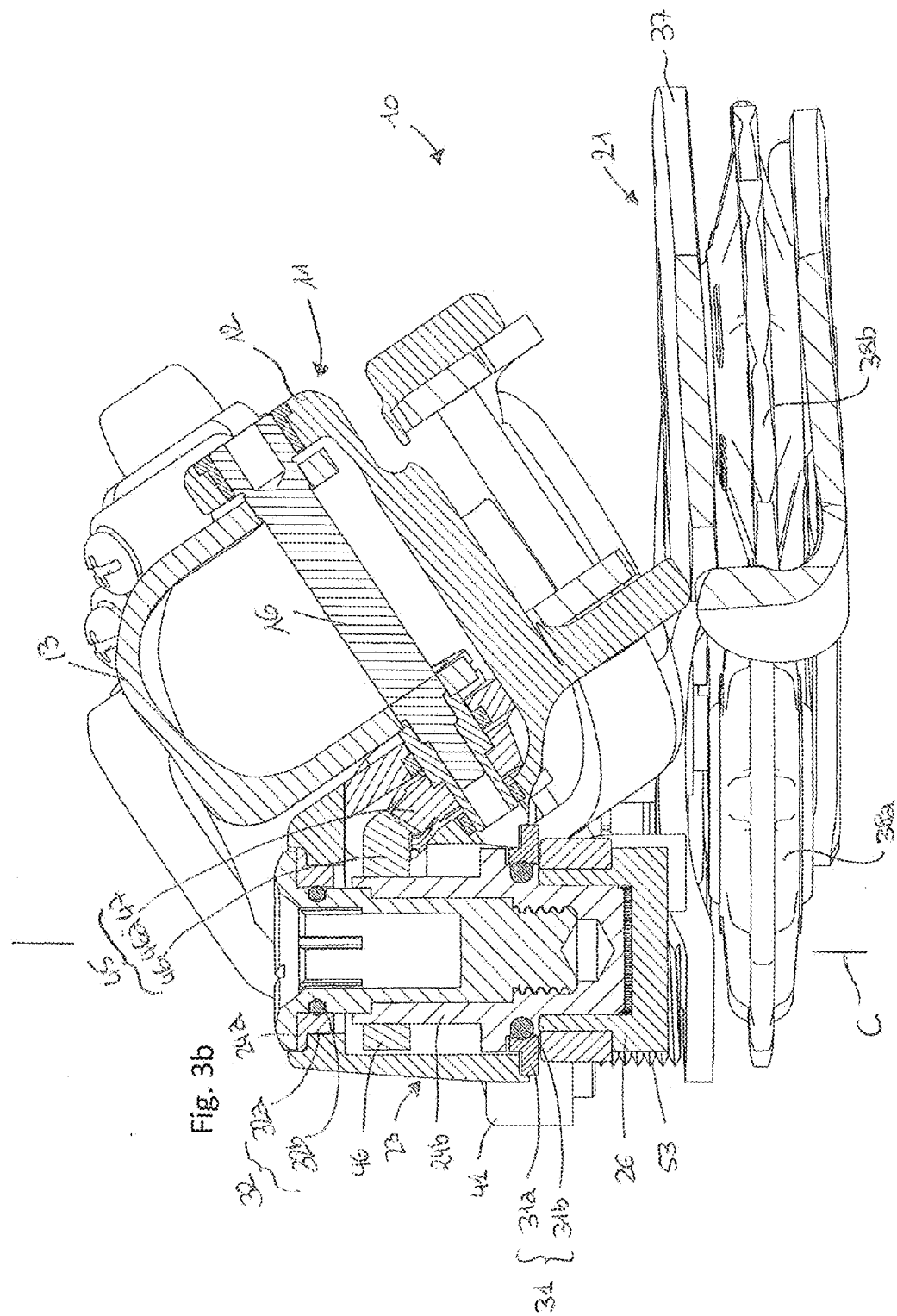
Figure 4A:
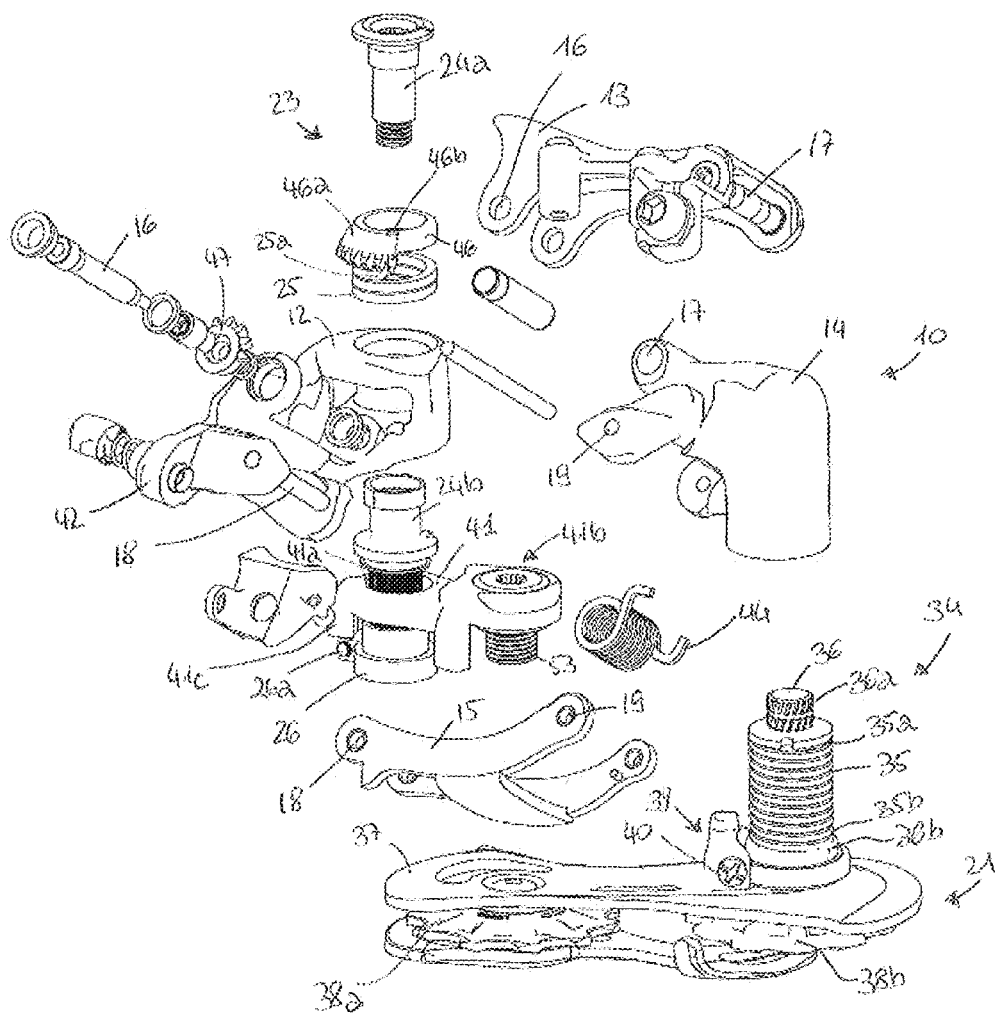
FIGS. 4a and 4b respectively show an exploded view and a section view along the line B-B of FIG. 2 of a second embodiment of the bicycle gearshift according to the present invention.
Figure 4B:
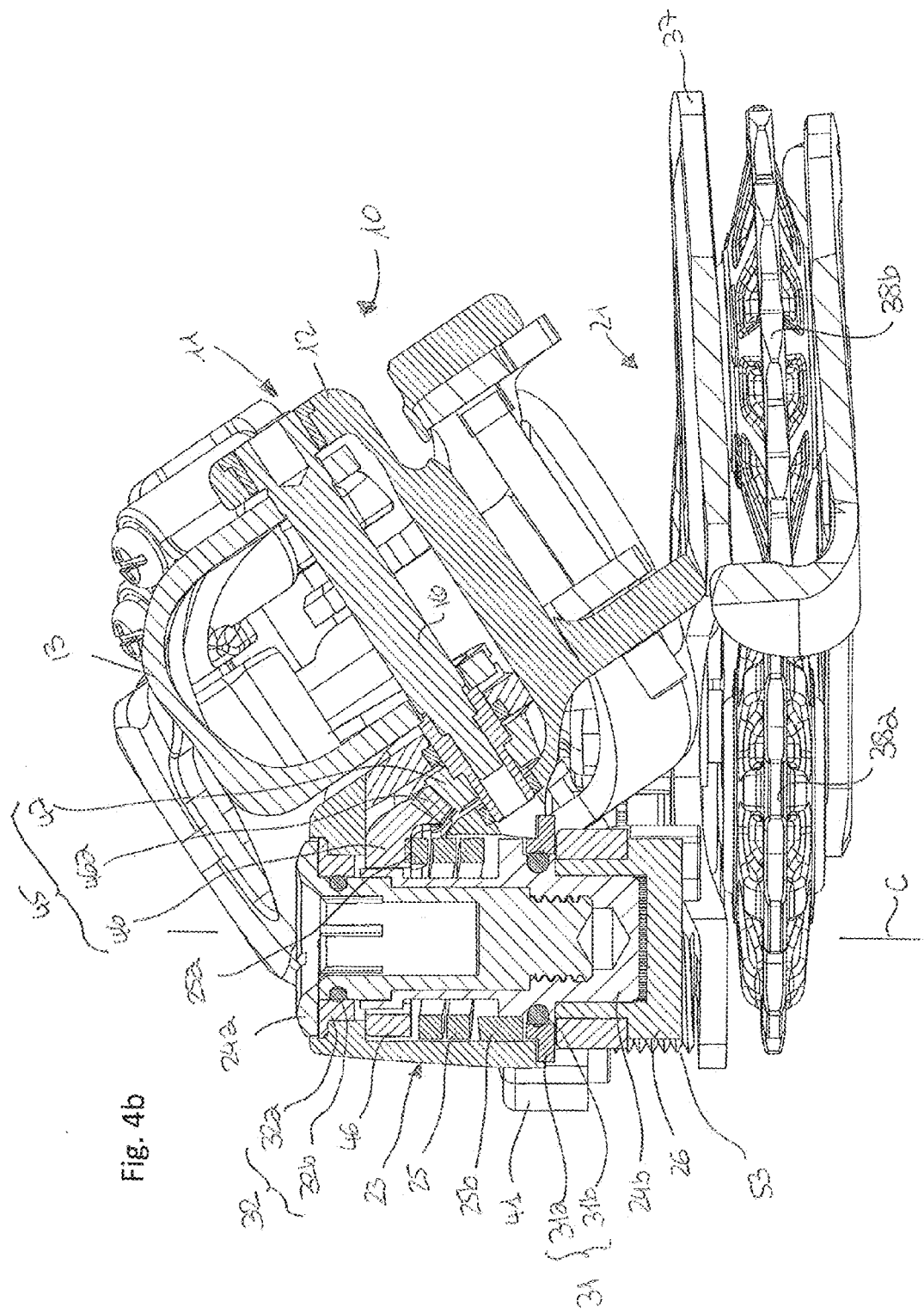

In the following description, in order to illustrate the figures identical reference numerals are used to indicate constructive elements with the same function.

With reference to the figures, a bicycle gearshift is shown, wholly indicated with 10.

The bicycle gearshift 10 being referred to is the rear one that moves a transmission chain 27 between a plurality of sprockets 33 having axis A, associated with a rear wheel 22 of a bicycle 100.

The bicycle gearshift 10 comprises a kinematic mechanism in the form of a four-bar linkage 11 with a base body 12 and a mobile body 14 connected together through a pair of connecting rods 13, 15 a first of which 13 is articulated to the base body 12 at a first hinge axis through a first pin element 16 and to the mobile body 14 at a second hinge axis through a second pin element 17, whereas a second connecting rod 15 is articulated to the base body 12 at a third hinge axis through a third pin element 18 and to the mobile body 14 at a fourth hinge axis through a fourth pin element 19.

The base body 12 is intended to be fixed to a frame 20 of the bicycle 100.

The mobile body 14, opposite the base body 12 in the four-bar linkage 11, carries a chain guide 21.

The chain guide 21 comprises a rocker arm 37 bearing an upper roller 38a and a lower roller 38b for relaying a closed-loop transmission chain 27.

For the coupling between the base body 12 and the frame 20 there is a first attachment group 23 that comprises a pin body 24a, 24b having axis C, intended for attaching said base body 12 to the frame 20 of the bicycle 100.

The pin body comprises a cylindrical bushing 24b and a closing screw 24a provided with an enlarged head suitable for going into abutment against the base body 12. The cylindrical bushing 24b and the closing screw 24a are screwed into one another in order to hold the base body 12 between them 24a, 24b, preventing any axial movement thereof along the axis C.

Between the base body 12 and the pin body 24a, 24b sliding means for rotation 31,32 are arranged.

In particular, between the base body 12 and the closing screw 24a a sliding ring 31a and a first gasket 31b are arranged whereas between the base body 12 and the cylindrical bushing 24b a bearing brass 32a and a second gasket 32b are arranged.

The cylindrical bushing 24b of the pin body 24a, 24b engages on an attachment element 26 to the frame 20 the relative angular position of which with respect to the frame 20 is adjustable.

For this purpose an adjustment screw 26a is provided for that engages tangentially on the attachment element 26 and goes into abutment with a projection 41c of the frame 20.

The attachment element 26 to the frame 20 and the adjustment screw 26a therefore constitute an initial setting interface of a relative angular position between the base body 12 and the frame 20.

The adjustment of the initial relative angular position between the base body 12 of the four-bar linkage kinematic mechanism 11 and the frame 20, generally carried out during assembly, has the purpose of adapting the bicycle gearshift 10 to the different types of frames 20 and sprockets 33, influencing the positions that can be taken up by the chain guide 21 with respect to such a frame 20 and, consequently, with respect to the sprockets 33.

In the illustrated embodiments, the initial setting interface 26, 26a of a relative angular position cooperates with a relay element 41 provided with a pair of holes 41a, 41b and on which the projection 41c is made. In particular, the attachment element 26 inserts in a first hole 41a, whereas the second hole 41b is intended for attaching to the frame 20 through a clamping screw 53.

The pin body 24a, 24b preferably has a shock-absorbing spring 25 mounted on it, coaxially to it 24a, 24b. By shock-absorbing spring a spring is meant that, in normal operation, is rigid, but that in the case of collisions, and thus when external forces above a certain limit act, intervenes, deforming and absorbing such external forces.

In the specific case of the present invention, in the case of collisions, the shock-absorbing spring 25 transfers its action to the base body 12, allowing a temporary mutual rotation between the base body 12 and the pin body 24a, 24b and in this way avoiding damage to the gearshift 10 as well as, in particular, to the four-bar linkage kinematic mechanism 11.

For this purpose, a first end 25a of the shock-absorbing spring 25 is indirectly associated with the base body 12 and a second end 25b engages in a hole (not illustrated) of the pin body 24a, 24b.

For the rotatable coupling between the mobile body 14 and the rocker arm 37 of the chain guide 21 there is a second attachment group 34 that comprises a fifth pin element 36 provided, at a first end 36a, with a connection interface to the mobile body 14 and fixedly connected, at a second end 36b, opposite the first, to the rocker arm 37.

A chain tensioning spring 35 is mounted coaxial to the fifth pin element 36, said spring acting on the tensioning chain 27 in order to determine a balanced condition that defines the positions that can be taken up by the chain guide 21 with respect to the frame 20.

The chain tensioning spring 35 engages, at a first end thereof 35a, with the connection interface to the mobile body 14 in order to counteract/limit a relative rotation between the mobile body 14 and the rocker arm 37 and keep the transmission chain 27 under tension.

At the second end 36b of the fifth pin element 36 there is an adjustment system 39 of the preload of the chain tensioning spring 35 that, in the illustrated embodiment, comprises a screw 40 constrained at the bottom to the chain tensioning spring 35 at its second end 35b that acts on a base shaped like a toothed ring (not illustrated).

For the chain tensioning spring 35, the initial adjustment has the purpose of setting the tension exerted on the chain 27.

There are also gearshift actuation means 28 suitable for modifying the set-up of the four-bar linkage kinematic mechanism 11 so as to determine a relative displacement between the mobile body 14 and the base body 12 and, consequently, a displacement of the chain guide 21 with respect to the frame 20.

The first and second preferred embodiment respectively illustrated in FIGS. 3a-3b and 4a-4b foresee mechanical actuation means 28 that comprise at least one control lever (not illustrated) placed in connection to the four-bar linkage-kinematic mechanism 11 through a control cable of the Bowden type (not illustrated), namely comprising an outer sheath relative to which an inner cable core is free to slide.

The four-bar linkage-kinematic mechanism 11 is provided with a sheath seat 42 for supporting the control cable and fixing the outer sheath thereof in position in order to allow the relative sliding between the inner core of the cable with respect to the outer sheath.

There is also a retaining clip 43 of the end of the core of the control cable arranged, in relation to the four-bar linkage-kinematic mechanism 11, in a position diagonally opposite the sheath seat 42, so that the traction imposed by a relative movement between the sheath and the core of the cable determines a deformation of the four-bar linkage-kinematic mechanism 11.

In the illustrated embodiment, the sheath seat 42 is made on the base body 12, preferably at the third pin element 18, and the retaining clip 43 is arranged on the first connecting rod 13, preferably at the second pin element 17.

The traction action imposed by the relative movement between the sheath and the core of the cable is counteracted by a return spring 44 that, in the specific case of the illustrated embodiments, is arranged at the fourth pin element 19.

Figure 5A:
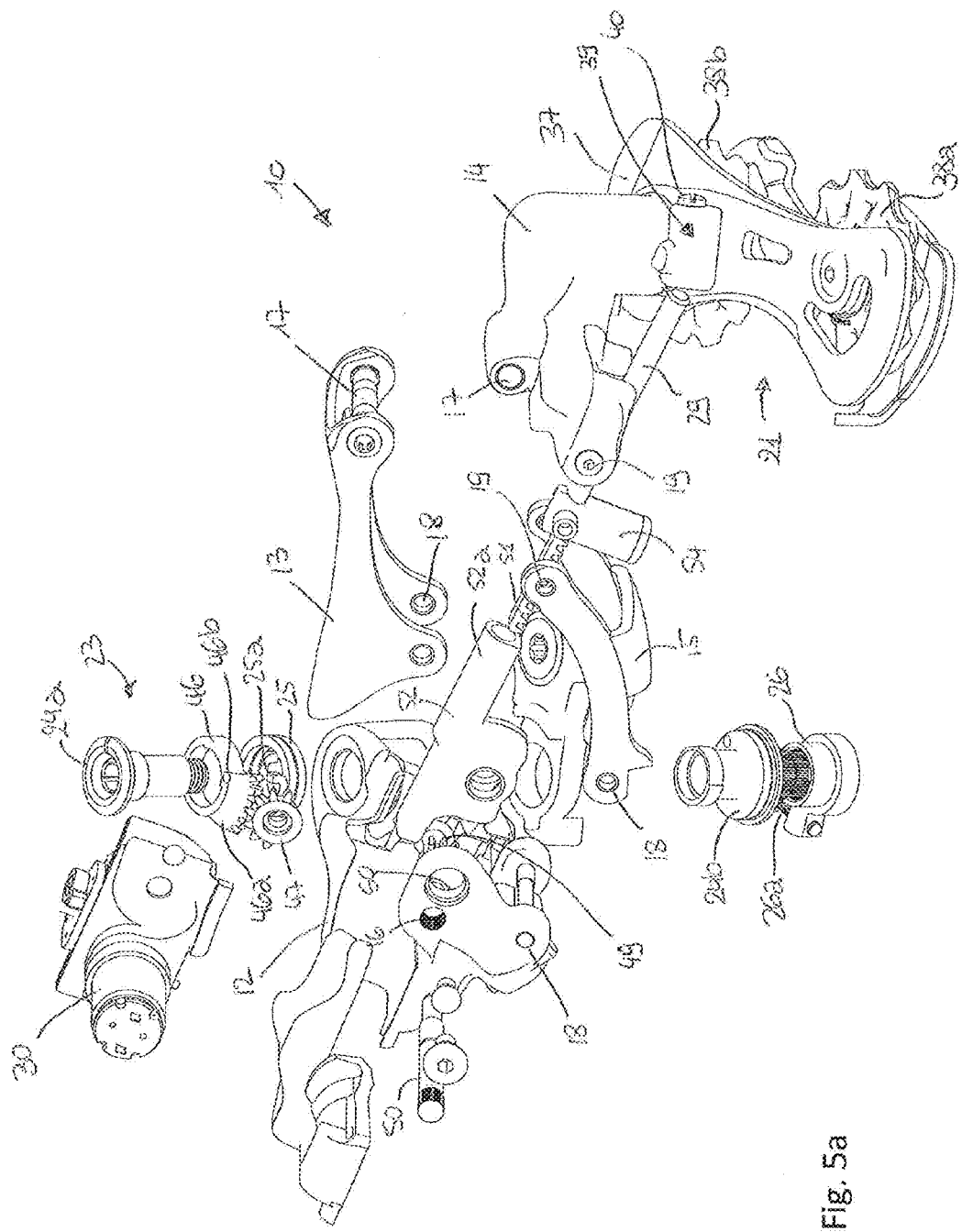
FIGS. 5a and 5b respectively show an exploded view and a section view along the line B-B of FIG. 2 of a third embodiment of the bicycle gearshift according to the present invention.
Figure 5B:
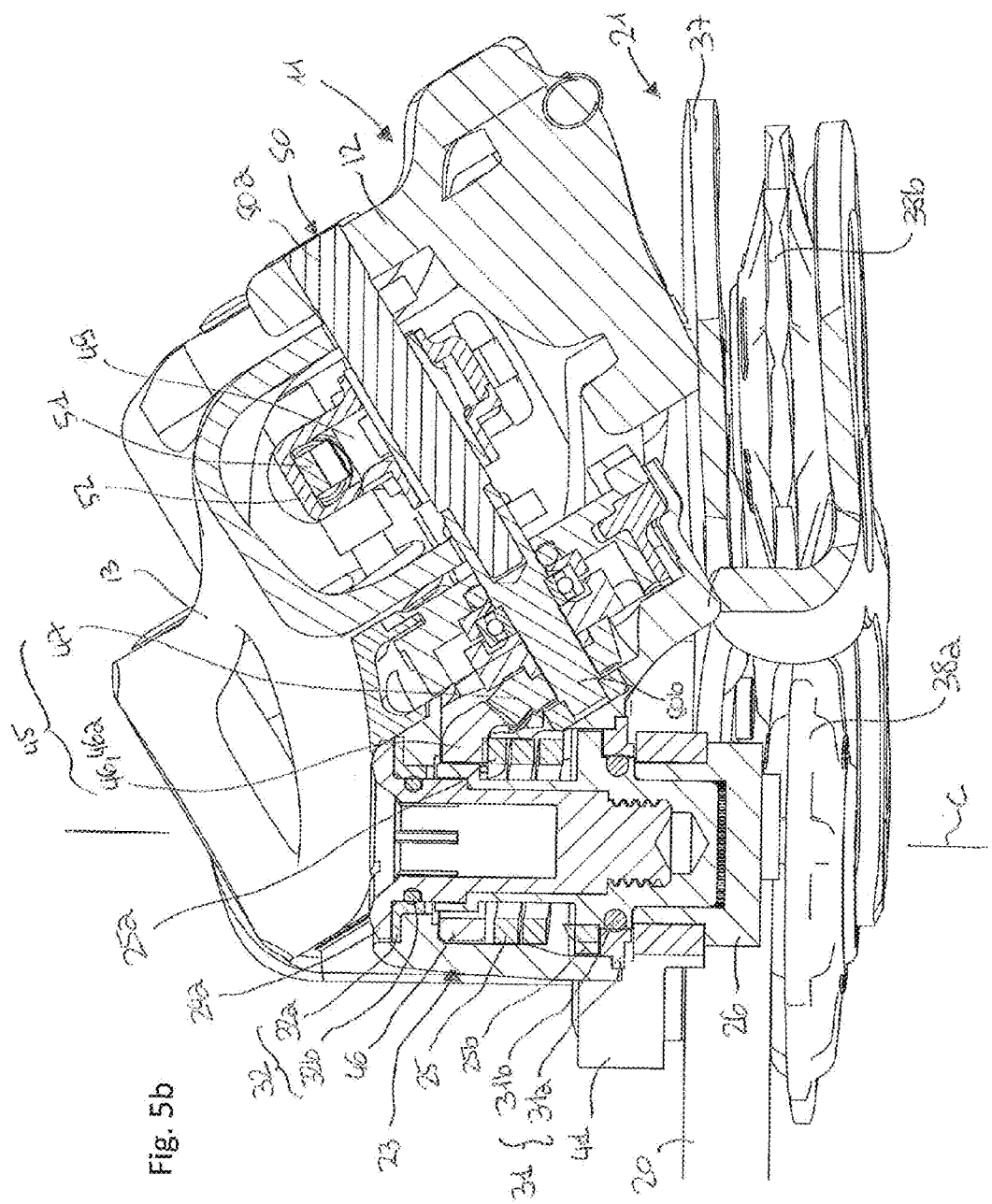
Figure 6A:
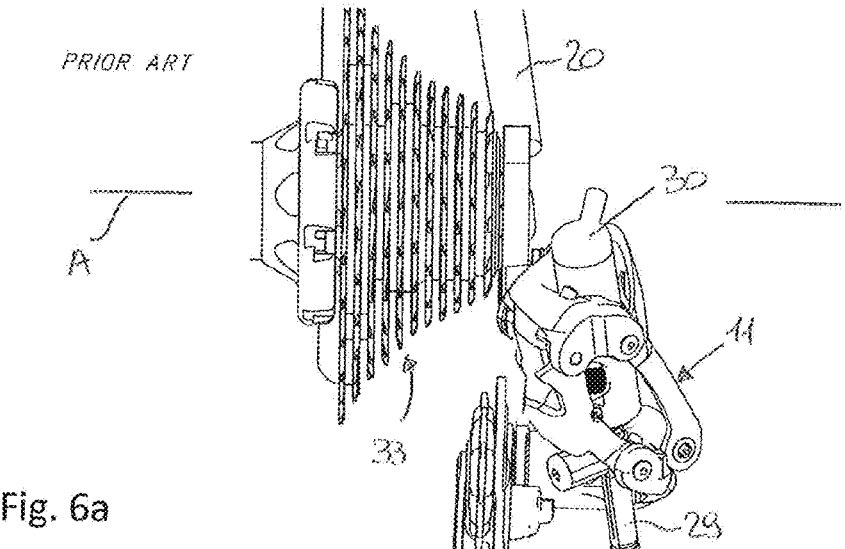
FIGS. 6a and 6b show a rear view, respectively, of a gearshift of the state of the art and of a gearshift according to the present invention in a first position.
Figure 6B:
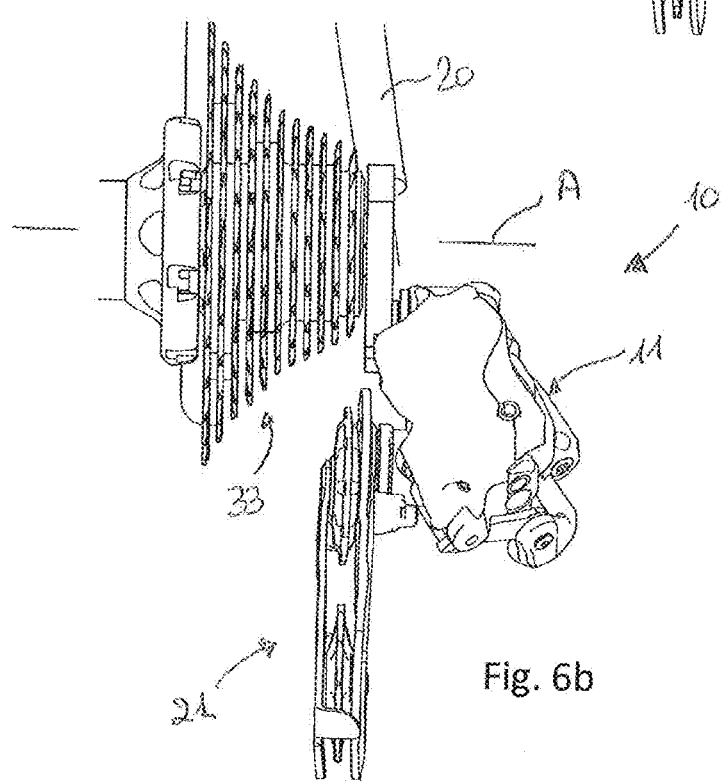
Figure 7A:
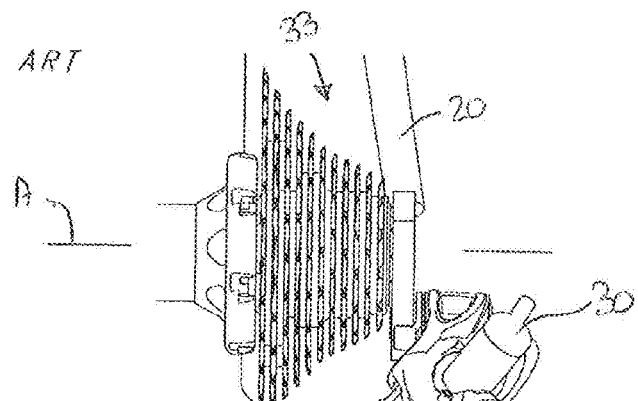
FIGS. 7a and 7b show a rear view, respectively, of a gearshift of the state of the art and of a gearshift according to the present invention in a last position.
Figure 7B:
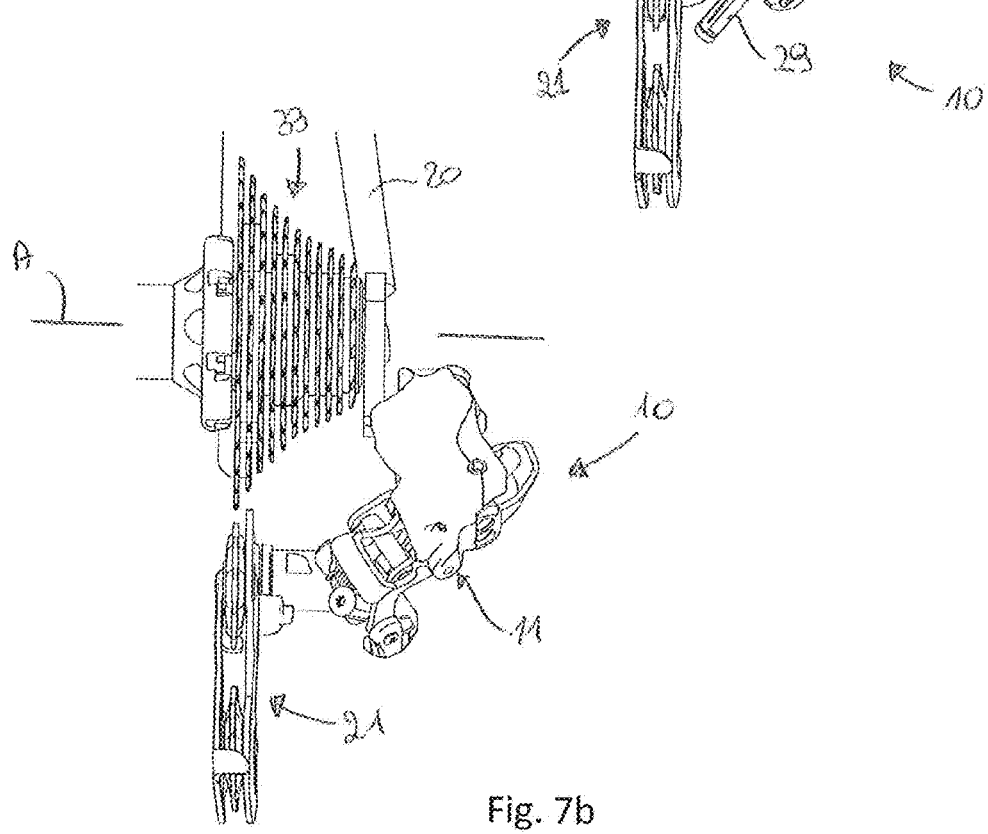

In the third preferred embodiment illustrated in FIGS. 5a-5b motorised actuation means 28 are provided for.

The motorised actuation means 28 comprise a motor 30 that drives the displacement of a shaft 29 which acts between diagonally opposite pin elements 16, 17, 18, 19 to impose a mutual displacement between the mobile body 14 and the base body 12.

In this way, the actuation means 28 are arranged along a diagonal of the four-bar linkage 11 and the actuation thereof causes a lengthening/shortening of the distance between the two opposite pin elements 16, 17, 18, 19 and therefore a deformation of the four-bar linkage-kinematic mechanism 11.

Preferably, the free end of the shaft 29 is constrained to a pin element 16, 17, 18, 19 through the interposition of a release element 54.

In accordance with a preferred embodiment that is not illustrated, the motor 30 is supported inside the four-bar linkage kinematic mechanism 11 through a support shell constrained in a tilting manner to the pin element 16, 17, 18, 19 opposite to the pin element constrained to the free end of the shaft 29. For this purpose, the pin element 16, 17, 18, 19 that bears the shell is made up of two half-pins that engage so as to freely rotate in two opposite seats of the support shell.

Preferably, the motor 30 is of the electric type and drives the displacement purely in translation of the shaft 29.

Alternatively, the motor 30 is of the type described in EP1357023, having a screw arranged axially along the motor axis and set in rotation by the motor 30 and a mother screw in meshing engagement with the screw, fixed to an opposite pin element 16, 17, 18, 19 with respect to the pin element that bears the tilting shell of the motor 30.

The preferred embodiment illustrated in FIGS. 5a-5b foresees the use of an electric motor 30 with rotary outlet shaft (not illustrated). In such a third embodiment, the motor 30 is arranged inside the four-bar linkage kinematic mechanism 11 so as to have its rotary outlet axis (not shown) arranged perpendicular to the shaft 29 arranged between diagonally opposite pin elements.

A reduction stage (not illustrated) is also provided for, suitable for transferring the rotary motion of the outlet shaft of the motor 30 to an actuation pin 50 substantially arranged between the first 16 and the third 18 pin element and parallel to them.

The actuation pin 50 is free to rotate with respect to the first connecting rod 13 and to the base body 12 and carries a toothed spindle 49 that rotates as a unit with it 50 suitable for cooperating, by shape coupling, with a rack 51 formed on the shaft 29 in order to determine a displacement in translation thereof.

The shape coupling between the toothed spindle 49 and the rack 51 is preferably maintained through a guide shell 52 idly mounted on the actuation pin 50.

The guide shell 52 is provided with a tubular portion 52a in which the rack 51 is free to translate.

The actuation pin 50 preferably consists of two actuation half-pins 50a, 50b fixedly connected to one another. The two actuation half-pins 50a, 50b are free to rotate with respect to the first connecting rod 13 and to the base body 12. For this purpose, the first semi-actuation pin 50a inserts in the base body 12 through interposition of a sliding bush (not illustrated).

According to the present invention, the first attachment group 23 comprises a kinematic mechanism 45 for changing the relative position between the base body 12 of the four-bar linkage kinematic mechanism 11 and the frame 20 as a function of a primary displacement of the chain guide 21 so as to determine a change in the set-up of the chain guide 21.

The means 45 for changing the relative position comprise a rotary body 46 provided with at least one toothed sector 46a connected to the pin body 24a, 24b so that a rotation of the rotary body 46 determines a relative rotation between the pin body 24a, 24b and the base body 12 about the axis C of the pin body 24a, 24b, and at least one pinion 47, preferably having a frusto-conical configuration, which engages with the toothed sector 46a in order to transfer a controlled rotation to it.

In particular, the rotary body 46 is fixedly connected to the cylindrical bushing 24b of the pin body 24a, 24b possibly through the interposition of the shock-absorbing spring 25.

In such a preferred embodiment, the shock-absorbing spring 25 engages, at its first end 25a, with a hole 46b made on the toothed sector 46a of the rotary body 46.

The pinion 47 is mounted in a fixedly connected manner on a pin element 16, 50 or half-pin 50b on which the controlled rotation is imparted that at the same time determines a displacement of the chain guide 21, having at least one axial component.

The controlled rotation can be imparted on the pin element 16,50 or half-pin 50b in a different way according to the specific embodiments.

According to the first and second preferred embodiment respectively illustrated in FIGS. 3a-3b and 4a-4b, the means 45 for changing the initial relative position are actuated through a relative rotation between the base body 12 and the first connecting rod 13 of the four-bar linkage kinematic mechanism 11.

Such a relative rotation between the base body 12 and the first connecting rod 13 also determines a deformation of the four-bar linkage kinematic mechanism 11 and, consequently, a primary displacement of the chain guide 21 along the axis A.

So that a rotation between base body 12 and connecting rod 13 determines a rotation of the pinion 47, the latter is fixedly connected to the first pin element 16, which in turn is fitted to the first connecting rod 13.

In this way, the movement of the first connecting rod 13 causes the movement of the first pin element 16 which, in turn, determines a rotation of the pinion 47 and, consequently, of the toothed sector 46a of the rotary body 46 and of the cylindrical bushing 24b of the pin body 24a, 24b.

In this way, there is therefore a relative rotation between the base body 12 and the pin body 24a, 24b of the first attachment group 23 correlated to an axial displacement of the chain guide 21.

According to the third preferred embodiment illustrated in FIGS. 5a-5b, the means 45 for changing the initial relative position are actuated through the rotation of the actuation pin 50 or, in particular, of the first actuation half-pin 50a, imparted by the motor 30 through the reduction stage.

In this way the pinion 47 mounted fixedly connected to the second semi-actuation pin 50b, in turn fixedly connected to the first 50a, is also set in rotation, transferring the rotary motion to the toothed sector 46a of the rotary body 46 with which it is shaped coupled.

Such a rotation of the toothed sector 46a determines a relative rotation between the base body 12 and the pin body 24a, 24b of the first attachment group 23.

Given that the rotation of the actuation pin 50 imparted by the motor 30 also determines a rotation of the toothed spindle 49 and, consequently, a linear translation of the shaft 29 following the coupling between the toothed spindle 49 and the rack 51, there is simultaneously a deformation of the four-bar linkage kinematic mechanism 11 which in turn determines a primary displacement of the chain guide 21 along the axis A.

Also in this case, therefore, the change in the initial relative position between the base body 12 and the pin body 24a, 24b of the first attachment group 23 is correlated to an axial displacement of the chain guide 21.

In the preferred embodiments illustrated, once the deformation of the four-bar linkage kinematic mechanism 11 has ended and a stable engagement condition of the transmission chain 27 with a sprocket 33 has been reached, the shock-absorbing spring 25 transfers its action to the base body 12 through the fixed constraint that is established between the toothed sector 46a of the rotary body 46 with the pinion 47.

Indeed, the pinion 47 is in turn fitted to a pin element 16, 50 or half-pin 50b that, in such a stable condition, is fixedly connected to the base body 12.

The operation of the bicycle gearshift 10 according to the invention is as follows.

Following actuation of the gearshift 10, the chain guide 21 is moved along a direction having at least one axial component, i.e. a component parallel to the axis A of the sprockets 33, to go up to the sprocket 33 on which the transmission chain 27 must be positioned.

FIGS. 6a-6b and 7a-7b respectively show a gearshift of the state of the art and a gearshift according to the present invention in the first and last position, i.e. at the smallest sprocket 33 and at the largest one.

Such a displacement is determined by a deformation of the four-bar linkage kinematic mechanism 11 controlled through the mechanical or motorized actuation means 28 according to the particular embodiment.

Following the actuation through the relative means 28, there is an actuation of the kinematic mechanism 45 for changing the relative angular position between the base body 12 and the pin body 24a, 24b of the first attachment group 23.

This results in a new balanced set-up being reached which, in the case of the highest positions, at the largest sprockets, determines a vertical distancing of the chain guide 21 from them.

It is therefore possible, in the assembly step of the bicycle 100, to adjust the initial relative angular position between the base body 12 and the pin body 24a, 24b of the first attachment group 23 and the preload of the chain tensioning spring 35 so that the resulting set-up maintains, in the first positions, a shorter distance of the chain guide 21 from the sprockets with a smaller diameter.

The configuration change effect obtained through the gearshift 10 according to the present invention is clearly shown from the comparison between FIGS. 6a-6b and 7a-7b.

From the description that has been made the features of the bicycle gearshift according to the present invention are clear, just as the relative advantages are also clear.

Thanks to the change in the initial relative position between the base body of the four-bar linkage kinematic mechanism and the pin body of the first attachment group it is possible to reach relative positions between the chain guide and the sprockets that make it possible, on the one hand, to obtain greater sensitivity of control with respect to gearshifts of the state of the art, and on the other hand to reduce the drawbacks linked to the chain guide getting too close to the sprocket with the largest diameter.

From the embodiments described above further variants are possible, without departing from the teaching of the invention.

Indeed, it is possible to foresee for the gearshift actuation means to be of a different type or be arranged so as to act on a different diagonal of the four-bar linkage kinematic mechanism with respect to those illustrated in the preferred but not limiting embodiments discussed.

Finally, it is clear that the bicycle gearshift thus conceived can undergo numerous modifications and variants, all of which are covered by the invention; moreover, all of the details can be replaced by technically equivalent elements. In practice, the materials used, as well as the sizes, can be whatever according to the technical requirements.

What is claimed is:

1. Bicycle gearshift comprising a kinematic mechanism in the form of a four-bar linkage with a base body and a mobile body connected together through a pair of connecting rods articulated to said base body and to said mobile body at four pin elements, each pair of opposite pin elements of said four pin elements defining a diagonal of said four-bar linkage-kinematic mechanism, and a first attachment group of said base body for attaching to a bicycle frame, said mobile body being connected to a chain guide at a second attachment group, said four-bar linkage-kinematic mechanism being associated with gearshift actuation means suitable for deforming said four-bar linkage-kinematic mechanism so as to determine a displacement of said mobile body with respect to said base body and consequently a primary displacement of said chain guide in the axial direction with respect to the axis (A) of a cogset, wherein said first attachment group comprises a kinematic mechanism for changing the relative angular position between said base body of said four-bar linkage-kinematic mechanism and said frame as a function of said primary displacement of said chain guide, wherein said first attachment group comprises a pin body having axis (C), intended to attach said base body to the frame of the bicycle, and an interface for initially setting a relative angular position between said base body and said frame, said interface for initially setting the relative position between said base body and said frame comprising an attachment element in which said pin body engages and an adjustment screw that engages on said attachment element going into abutment against said frame.

2. Bicycle gearshift according to claim 1, wherein said first attachment group comprises a shock-absorbing spring that engages at its first end with said rotary body and is constrained at its second end to said pin body.

3. Bicycle gearshift according to claim 1, wherein said pinion is mounted in a fixedly connected manner on a pin element of said four pin elements, said pin element being fixedly connected to one of said connecting rods.

4. Bicycle gearshift according to claim 1, wherein said pinion is mounted in a fixedly connected manner on an actuation pin substantially parallel to said pin elements, said actuation pin being set in rotation by said gearshift actuation means.

5. Bicycle gearshift according to claim 1, wherein said gearshift actuation means are of the mechanical type and comprise:
a sheath seat for supporting a control cable comprising an outer sheath relative to which an inner cable core is free to slide, said sheath seat fixing said outer sheath in position in order to allow the sliding of said inner core;
a retaining clip of an end of said inner core, said sheath seat and said clip being arranged substantially at pin elements that are diagonally opposite in said four-bar linkage-kinematic mechanism;
a return spring arranged at one of said pin elements, to deform said four-bar linkage-kinematic mechanism in contrast to the traction imposed by a relative translation between said outer sheath and said inner core of said control cable.

6. Bicycle gearshift according to claim 1, wherein said gearshift actuation means are of the motorised type and comprise a motor that drives the displacement of a shaft along a diagonal of said four-bar linkage-kinematic mechanism.

7. Bicycle gearshift according to claim 4, wherein said gearshift actuation means are of the motorised type and comprise a motor that drives the displacement of a shaft along a diagonal of said four-bar linkage-kinematic mechanism and wherein said motor has an outlet axis perpendicular to said shaft, said motor driving a rotation of said actuation pin, said actuation pin bears a toothed spindle rotating as a unit with it in shape coupling with a rack formed on said shaft in order to determine a displacement in translation of said shaft.

8. Bicycle gearshift according to claim 7, wherein said rack is guided in translation within a tubular portion of a guide shell mounted idly on said actuation pin, said guide shell enclosing said toothed spindle in order to keep said shape coupling between said toothed spindle and said rack.

9. Bicycle gearshift according to claim 1, wherein said pin body of said first attachment group comprises a cylindrical bushing and a closing screw provided with an enlarged head suitable for going into engagement with said base body, said cylindrical bushing and closing screw being screwed into one another in order to hold said base body in the direction of said axis (C) of said pin body, sliding means for rotation being arranged between said base body and said pin body.

10. Bicycle gearshift according to claim 1, wherein said second attachment group comprises a fifth pin element connected, at a first end, in a fixed manner to said chain guide and provided, at a second end, opposite the first, with a connection interface to said mobile body, said second attachment group comprising a chain tensioning spring, said fifth pin element acting as a support body for said chain tensioning spring.

11. Bicycle gearshift comprising a kinematic mechanism in the form of a four-bar linkage with a base body and a mobile body connected together through a pair of connecting rods articulated to said base body and to said mobile body at four pin elements, each pair of opposite pin elements of said four pin elements defining a diagonal of said four-bar linkage-kinematic mechanism, and a first attachment group of said base body for attaching to a bicycle frame, said mobile body being connected to a chain guide at a second attachment group, said four-bar linkage-kinematic mechanism being associated with gearshift actuation means suitable for deforming said four-bar linkage-kinematic mechanism so as to determine a displacement of said mobile body with respect to said base body and consequently a primary displacement of said chain guide in the axial direction with respect to the axis (A) of a cogset, wherein said first attachment group comprises a kinematic mechanism for changing the relative angular position between said base body of said four-bar linkage-kinematic mechanism and said frame as a function of said primary displacement of said chain guide, wherein said first attachment group comprises a pin body having axis (C), intended to attach said base body to the frame of the bicycle, said kinematic mechanism for changing the relative angular position between said base body and said frame comprising:

a rotary body connected to said pin body so that a rotation of said rotary body determines a relative rotation about said axis (C) between said pin body and said base body;

a toothed sector formed on said rotary body; and at least one pinion engaged with said toothed sector for transferring a controlled rotation to it, said pinion being directly or indirectly set in rotation by said gearshift actuation means, wherein said first attachment group comprises an interface for initially setting a relative angular position between said base body and said frame, said interface for initially setting the relative position between said base body and said frame comprising an attachment element in which said pin body engages and an adjustment screw that engages on said attachment element going into abutment against said frame.

* * * * *